United States Patent [19]

Sanok et al.

[11] Patent Number: 4,766,025
[45] Date of Patent: Aug. 23, 1988

[54] COMPOSITE MOLDED ARTICLE AND METHOD OF MAKING SAME

[75] Inventors: John L. Sanok, Grosse Ile; Michael L. Piechura, Detroit, both of Mich.

[73] Assignee: Sheller Globe Corp., Toledo, Ohio

[21] Appl. No.: 911,499

[22] Filed: Sep. 25, 1986

[51] Int. Cl.⁴ .................... B32B 3/26; B32B 5/18; B29C 67/22; B29C 39/10
[52] U.S. Cl. ............................ 428/159; 249/142; 264/46.6; 264/46.8; 264/250; 264/255; 264/DIG. 83; 425/120; 425/127; 425/817 R; 428/316.6; 428/319.7
[58] Field of Search .......... 264/46.8, DIG. 83, 250, 264/255; 249/142; 425/120, 127, 817 R; 428/159, 316.6, 319.7

[56] References Cited

U.S. PATENT DOCUMENTS

| | | | |
|---|---|---|---|
| 3,112,987 | 12/1963 | Griffiths et al. | 264/46.8 X |
| 4,303,728 | 12/1981 | Houdek et al. | 264/DIG. 83 |
| 4,420,447 | 12/1983 | Nakashima | 264/46.8 X |
| 4,444,705 | 4/1984 | Kumasaka et al. | 264/DIG. 83 |
| 4,529,639 | 7/1985 | Peoples, Jr. et al. | 264/46.8 X |

FOREIGN PATENT DOCUMENTS

| | | | |
|---|---|---|---|
| 56-93525 | 7/1981 | Japan | 264/46.8 |
| 483768 | 2/1970 | Switzerland | 264/DIG. 83 |

OTHER PUBLICATIONS

SAE Technical Paper Series 820423—"RIM Urethane/Vinyl Composites as Interior Trim Parts", Max F. Mann, Mobay Chemical Corp. 2/22–26/82.

Primary Examiner—Anderson, Philip
Attorney, Agent, or Firm—Harness, Dickey & Pierce

[57] ABSTRACT

A composite molded article and a method of fabricating such an article is disclosed, which is especially well-suited for forming one-piece interior vehicle panels, by way of a single molding operation, wherein the one-piece interior panel can be easily installed as a unit within the vehicle. In the fabrication of the one-piece molded composite article, a deformable sheet material, such as vinyl, is positioned on a female molding surface and drawn into conformity with the female molding surface of the mold cavity, either with or without pre-heating or vacuum forming. The mold apparatus is closed and a first moldable material is introduced into the mold assembly, with certain predetermined portions thereof being blocked off. Subsequently, a second moldable material is introduced at least into the predetermined areas previously blocked off during the introduction of the first moldable material. By such a process, the one-piece molded article can be fabricated essentially in a single integrated operation, as a one-piece structure, while maintaining the capability of providing various materials or various characteristics at different locations on the one-piece article.

38 Claims, 3 Drawing Sheets

COMPOSITE MOLDED ARTICLE AND METHOD OF MAKING SAME

BACKGROUND AND SUMMARY OF THE INVENTION

The present invention relates generally to the molding articles having a multi-material composition, wherein such materials have different hardnesses or other characteristics. More specifically, the present invention finds particularly advantageous applicability in the manufacture of padded products such as vehicle interior panels.

In the past, multi-material composite structures such as vehicle interior door panels and the like were constructed using a plurality of discrete parts or portions of the composite panel that were assembled in a piece-by-piece manner during installation. Such constructions were found to be very expensive and inconvenient to manufacture and to install. More recently, however, it was found that such composite panels could be manufactured by stretching a sheet material composed of vinyl, for example, over a recessed cavity in a female mold member. The sheet material was then heated and pulled into the female cavity by applying a vacuum between the sheet material and the female mold member. The female mold cavity was then closed off with a male mold member and a moldable material, such as polyvinylchloride or polyurethane, was injected into the space between the sheet material and the male mold member. The pressure of the injection of the moldable material was found to more tightly urge the sheet material into contact with the recessed cavity of the female mold member, thereby enhancing the conformity of the sheet material with the female mold cavity.

The molding technique described above provided for the fabrication of a composite molded panel having an outer skin backed with a molded material, and thus represented a significant advancement in the fabrication technology for such composite panels. However, the advantages of this technique were not fully realized in applications wherein the panel was required to have different hardnesses or other characteristics at different locations thereon. In such applications, the technique described above did not eliminate the need for the expensive manufacturing of separate portions of the overall panel, which were required to be assembled in a piece-by-piece manner during installation. Therefore, although the above-discussed technique constituted a significant advancement, many of the previous problems in manufacturing and assembling such composite articles, with different characteristics at different locations thereon, were not overcome. Accordingly, the need became apparent to provide such composite panels or other molded articles that could be produced in a single, integrated operation and that could yield a one-piece composite article adapted for one-step installation in a vehicle or the like.

According to the present invention, a composite molded article is formed by providing a mold assembly having male and female molds with respective male and female molding surfaces. A deformable sheet material, such as vinyl or other such materials, is positioned on the female molding surface and vacuum-formed, either with or without preheating, in order to draw and conform the heated sheet material into the female mold surface. The male mold member is closed and tightly clamped onto the female mold member, which can be done either before or after the above-mentioned vacuum-forming of the sheet material. A first moldable material having certain predetermined characteristics is introduced into the mold assembly between the male mold surface and the conformed sheet material in order to form a preferably rigid substrate.

It has also been found that certain deformable sheet materials, such as certain foam-backed materials produced by DeWitte Lietaer for example, can be deformed into conformity with the female mold surface by cold flowing without the need for preheating or vacuum forming. Such cold flowing occurs during the introduction of the above-mentioned first moldable material.

During the introduction of the first moldable material, in the present invention, at least one predetermined area of the previously or simultaneously conformed sheet material is blocked off in order to substantially prevent the first moldable material from contacting such predetermined area of the sheet material. Finally, a second moldable material is introduced into the mold assembly between the male mold surface and the sheet material, at least at the previously-blocked off predetermined areas, and the mold assembly is opened to allow removal of the composite molded article after curing of the moldable materials.

The blocking off of the above-mentioned predetermined areas of the conformed sheet material can be accomplished by positioning a plug member or members in contact with the predetermined area or areas of the sheet material prior to the introduction of the first moldable material, with the plug member being removed prior to introduction of the second moldable material. In various embodiments of the present invention, the plug member or members can be removably inserted into the mold assembly between the male mold member and the sheet material, or can be movably interconnected with the male mold member for extension toward, and retraction away from the female mold member. By using the appropriate size, configuration and number of such plug members, the one-piece composite molded article can be fabricated during a process that integrates a number of steps into a single operation in order to produce a composite molded article having virtually any number of different configurations having different characteristics at various locations on the molded article. As a result, such a composite, one-piece molded article can be installed in a vehicle interior, or in other applications, in a single operation, thereby greatly contributing to the speed, simplicity, and economy of manufacture and installation of such an article.

Additional objects, advantages, and features of the present invention will become apparent from the following description and the appended claims, taken in conjunction with the accompanying drawings.

DETAILED DESCRIPTION OF THE PREFERRED EMBODIMENTS

FIGS. 1 through 5 illustrate various exemplary embodiments of an inventive composite molded article, and its associated molding apparatus and method, for fabricating a one-piece composite vehicle door interior panel. One skilled in the art will readily recognize from the following discussion, taken in conjunction with the accompanying drawings and claims, that the present invention is not limited to the fabrication of the particular composite vehicle interior door panel illustrated in the drawings. Rather, the present invention is equally applicable to the fabrication of other composite molded articles and to molding apparatuses other than those shown for purposes of illustration in the drawings.

Figure 1:
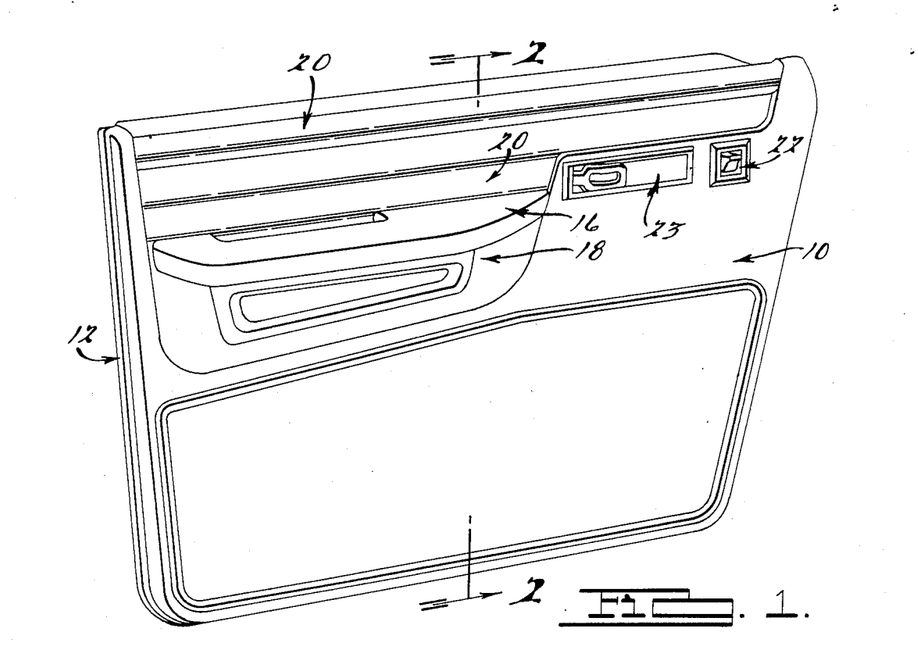
FIG. 1 illustrates an exemplary vehicle door interior panel fabricated according to the present invention.
Figure 2:
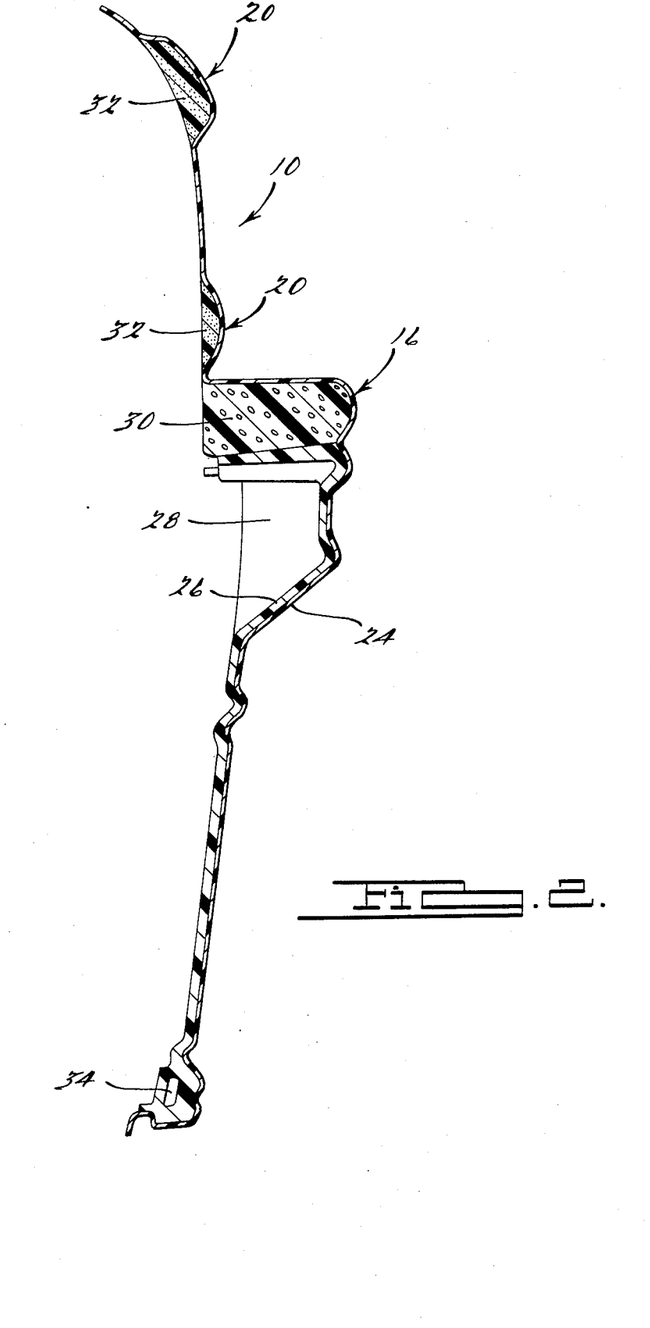
FIG. 2 is a cross-sectional view taken generally along line 2—2 of FIG. 1.

FIGS. 1 and 2 illustrate an exemplary molded interior door panel 10, according to the present invention, installed on a portion of a door structure 12. The interior door panel can include any number of configurations, such as an integral arm rest 16, an integral bolster 18, and one or more integral energy absorbing portions 20, all of which are integrally formed as a one-piece composite molded article.

As perhaps best illustrated in FIG. 2, the interior door panel 10 is composed of an outer skin 24 formed from a vinyl sheet or other sheet material, a relatively rigid substrate 26, a bolster supporting insert 28, and relatively soft inserts 30 and 32 for the integral arm rest 16 and the integral energy absorbing portions 20, respectively. The interior door panel 10 is fabricated as a one-piece composition, to which various items such as an accessory switch 22 or a door operating handle 23 (shown in FIG. 1) can be installed and interconnected with their respective vehicle mechanisms or systems. Depending upon the design and configuration of the particular door structure to which the interior door panel 10 is installed, a supporting or connecting frame 34, or other such connecting structure, can be integrally formed with the interior door panel 10 at its peripheral edges. Alternatively, the skin sheet material of the the interior door panel can be clamped or otherwise secured, at its periphery, to the door structure 12 in a manner well-known to those skilled in the art. Because of the rigidity of the rigid substrate 26, however, the interior door panel 10 is preferably relatively self-supporting, and is preferably attached to a supporting substructure of the door structure 12 by way of the frame 34. In either situation, the interior door panel 10 is adapted for convenient and economical installation on the door structure 12 as a one-piece composite article, in a one-step operation, with only the accessory switch 22, the door operating handle 23, or other such similar items requiring separate installation.

Figure 3:
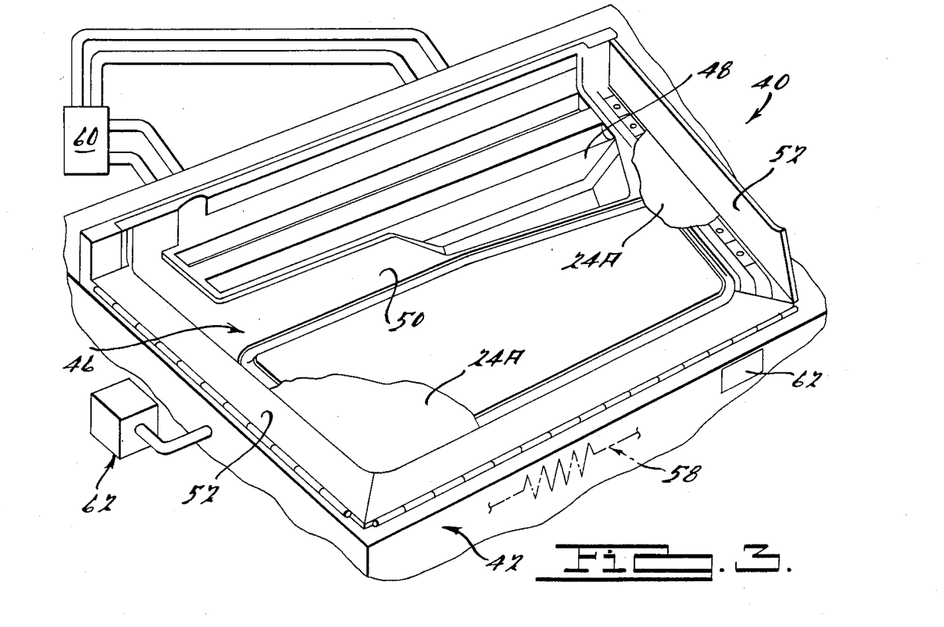
FIG. 3 is a diagrammatic representation of a female mold member according to the present invention, shown with a sheet material (broken away) positioned and clamped thereon.
Figure 4:
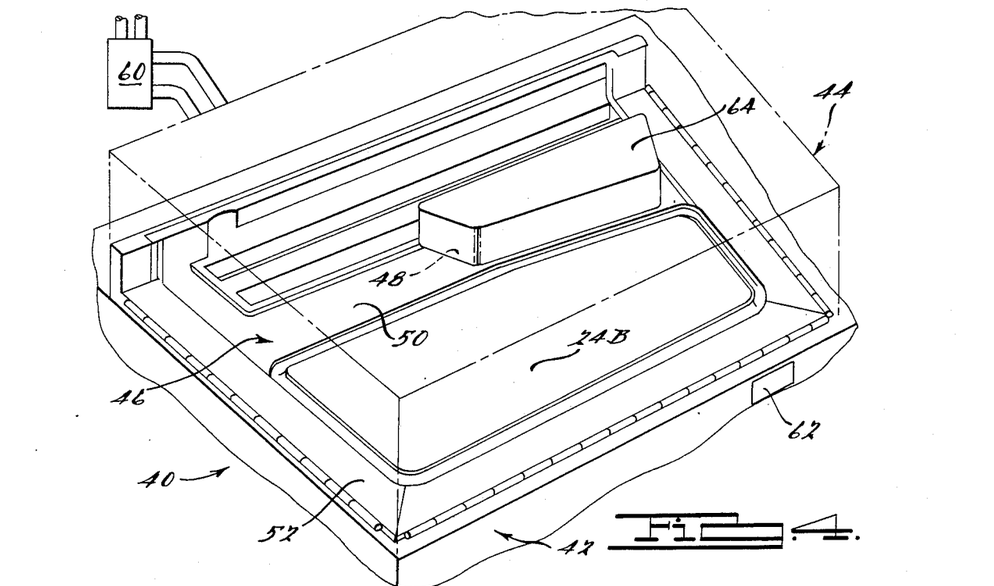
FIG. 4 is a diagrammatic representation similar to that of FIG. 3, but illustrating the sheet material drawn into conformity with the molding surface of the female mold member and with a removable plug member positioned thereon prior to closing of the mold assembly.
Figure 5:
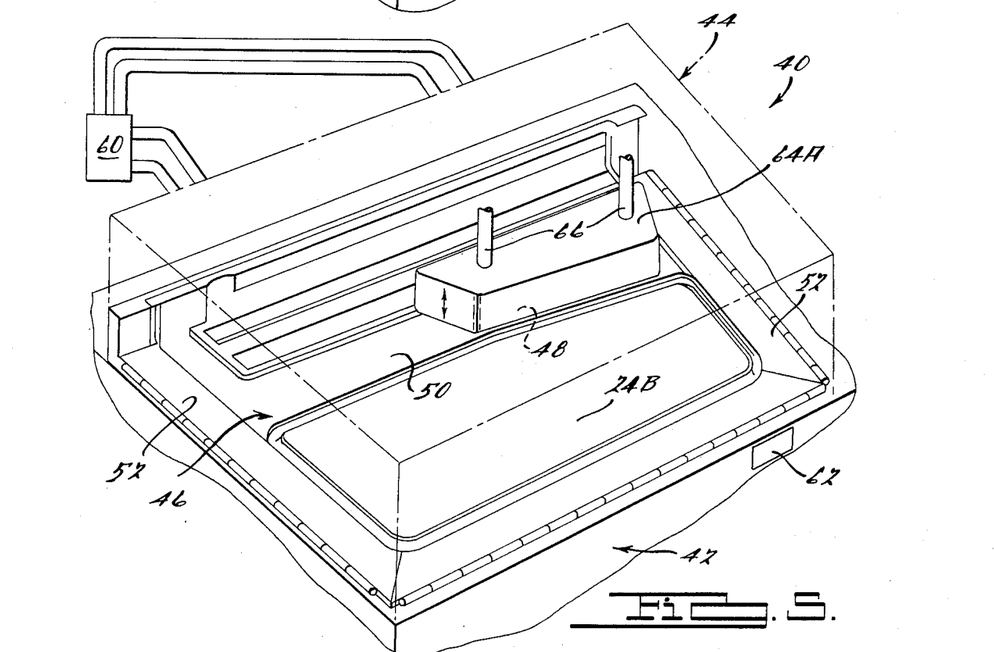
FIG. 5 is a diagrammatic representation similar to that of FIGS. 3 and 4, but illustrating a retractable and extendible plug member interconnected with a male mold member (shown in phantom lines), with the male mold member closed over the female mold member.

As shown in FIGS. 3 through 5, the interior door panel 10 is preferably fabricated as a one-piece integral, composite structure, in a single molding operation including a number of intermediate steps. A mold assembly 40 includes a female mold member 42 and a male mold member 44 (shown diagrammatically in phantom lines in FIGS. 4 and 5). The female mold member 42 includes a female molding surface 46 having a predetermined desired shape and configuration corresponding to the desired shape and configuration of the final interior door panel 10. Similarly, the male mold member 44 has a male molding surface (not shown) which generally corresponds and complementary to the shape and configuration of the female molding surface 46, with the exception of certain portions of the male molding surface that are provided to accommodate various shapes or structures such as the integral arm rest 16, the bolster insert 28, and the integral energy absorbing portions 20 mentioned above.

The female molding surface 46 of the female mold member 42 includes various cavities 48 and raised portions 50 corresponding to the desired shape and configuration of the interior door panel 10. The female mold member 42 also preferably includes exemplary clamping members 52 hingedly or otherwise interconnected therewith for clampingly securing a vinyl sheet or other sheet material to form the skin 24, as is explained in more detail below. In addition, the female mold member 42 can include a heating system diagrammatically indicated by reference numeral 58, a reaction injection molding system diagrammatically indicated by reference numeral 60, and a vacuum system diagrammatically indicated by reference number 62, all of which are well-known to those skilled in the art. In this regard, it should be noted that the heating system 58 can be an electrically operated system, a hot fluid system, or any other of a number of known mold heating apparatuses. Similarly, although the reaction injection molding system 60 is illustrated in the drawings, one skilled in the art will readily recognize that other molding systems, such as injection molding for example, can alternately be used.

The interior door panel 10 shown in FIGS. 1 and 2 is preferably fabricated by first positioning a vinyl sheet or other sheet material 24A (corresponding to the integral skin 24 of the door panel 10) over the female molding surface 46 of the female mold member 42. The sheet material 24A is heated in one embodiment of the invention, either separately before being positioned on the female mold member 42 or after being positioned thereon by way of the above-mentioned mold heating system 58. The heated sheet material 24A is then drawn downward by the vacuum system 62, as shown in FIGS. 3 through 5, into a conforming contact (as indicated by reference numeral 24B) with the cavities 48 and the raised portions 50 of the female molding surface 46 by operation of the vacuum system 62. It should be noted, as will be readily recognized by one skilled in the art, that either of the steps of heating the sheet material 24A or vacuum-drawing the sheet material 24A into conformity with the female molding surface 46 can be performed either before or after the mold assembly 40 is closed.

After the sheet material 24A has been drawn into conformity with the female molding surface 46, as indicated by reference numeral 24B, or simultaneously therewith as described below, a first moldable material, which preferably comprises a multi-constituent urethane or urethane-bearing material, is introduced into the mold assembly 40, between the male molding surface of the male mold member 44 and the conformed sheet material 24B. During such introduction of the first moldable material, which is preferably accomplished by a reaction injection molding technique well-known in the art, one or more predetermined areas of the sheet material 24B are sealingly blocked off in order to substantially prevent the first moldable material from contacting the predetermined area or areas of the conformed sheet material 24B. In the exemplary embodiments depicted in the drawings, such predetermined areas generally constitute the areas at which the integral arm rest 16, the bolster 18 (and the bolster insert 28), and the integral energy absorbing portions 20, are to be located. The first moldable material curves and thus forms the relatively rigid substrate 26 in contact and conformity with the drawn and conformed sheet material 24B, in all areas of the interior of the mold assembly 40 except those blocked off during the introduction of the first moldable material. In this regard, it should be noted that an insert, such as the bolster insert 28 in FIG. 2, can be integrally molded onto the sheet material 24B during the introduction of the first moldable material, or during introduction of the second moldable material discussed below.

The above-mentioned blocking off of predetermined areas of the previously or simultaneously drawn and conformed sheet material 24B can be accomplished in the present invention by way of a removable plug member 64 shown in FIG. 4, which is sealingly inserted into the mold assembly 40 prior to the introduction of the first moldable material used for the formation of the rigid substrate 26, and removed from the mold assembly 40 after the curing of the rigid substrate 26. Alternately, however, as shown in FIG. 5, a retractable and extendible plug member 64A is movably interconnected with the male mold member 44, and can thus be extended into sealing contact with the predetermined areas of the sheet material 24B, and retracted therefrom, without opening the mold assembly 40.

As mentioned above, certain deformable sheet materials can be drawn into conformity with the female molding surface 46, without preheating, or without vacuum forming, merely by the force of the first moldable material being introduced into the mold assembly 40. In such instances, either or both of the heating system 58 or the vacuum system 62 can be either eliminated from the mold assembly 40 or not used when forming articles using such sheet materials. An example of such a sheet material that requires neither preheating nor vacuum forming during the novel process of the present invention is designated as X-100 and produced by DeWitte Lietaer.

After the first moldable material is introduced into the mold assembly 40 and cured therein, a second moldable material, which also preferably comprises a reaction injection molded urethane material, is introduced into at least the predetermined areas previously blocked off by the plug members 64 or 64A. Alternately, such second moldable material, which is preferably a relatively soft urethane foam material, can be introduced not only in the predetermined areas corresponding with the arm rest 16, the bolster 18, and the energy absorbing portions 20, but can also be introduced between the rigid substrate 26 and the male mold member 44, in order to provide further energy absorbing capabilities for the interior door panel 10 if deemed desirable or necessary.

As one skilled in the art will readily recognize, the movable extension or retraction of the plug member 64A shown in FIG. 5 can be accomplished in any of a number of ways known in the art, such as by way of struts 66 that are activated by any of a number of known mechanisms on the male mold member 44 to forcibly urge and extend the movable plug member 64A outwardly away from the male mold member 44 into sealing contact with the sheet material 24B on the female mold member 42. Similarly, by way of any of a number of known mechanisms known to those skilled in the art, the movable plug member 64A can be retracted into a recess or other cavity formed in the male mold member 44 for housing the movable plug member 64A when not in an extended position relative to the female mold member 42.

Furthermore, it should be noted that the provision of hinged or other similar clamping members 52 at peripheral areas of the mold assembly 40 can also be provided at intermediate, or non-peripheral, areas of the mold assembly, wherein certain surface details desired on the finished surface of the skin 24 shown in FIGS. 1 and 2 are desired. Such provision of additional clamping members at such intermediate areas on the outer skin 24 of the interior door panel 10 enhances the surface detail thereon by providing additional clamping force in a direction complementing the forces exerted on the sheet material 24A during the vacuum-forming operation described above. As one skilled in the art will now readily recognize, such clamping members can comprise any of a number of known mold clamping apparatuses known in the art.

The foregoing discussion discloses and describes exemplary embodiments of the present invention. One skilled in the art will readily recognize from such discussion, and from the accompanying drawings, that various changes, modifications and variations may be made therein without departing from the spirit and scope of the invention as defined in the following claims.

We claim:

1. A method of making a composite molded article, comprising the steps of:
   providing a selectively closable mold assembly including a first mold and a second mold having respective first and second molding surfaces, said first and second molding surfaces having predetermined respective shapes;
   positioning a deformable sheet material on said second molding surface;
   urging said sheet material into said second mold in order to conform said sheet material to said second mold surface in a configuration corresponding generally to said predetermined shape of said second molding surface;
   closing said mold assembly;
   forming a relatively rigid substrate base for said sheet material by introducing a first moldable material into said closed mold assembly between said first molding surface and said sheet material, said first moldable material being composed of a material having a rigidity when cured that is greater than the rigidity of said sheet material in order to retain said sheet material in said configuration corresponding generally to said predetermined shape of said second molding surface;
   blocking off at least one predetermined area of said sheet material during said introduction of said first moldable material in order to substantially prevent said first moldable material from contacting said predetermined area of said sheet material; and
   introducing a second moldable material into said mold assembly between said first mold surface and said conformed sheet material at least at said previously block-off predetermined area.

2. A method according to claim 1, wherein said blocking off step includes: positioning at least one plug member in contact with said predetermined area of said sheet material prior to introducing said first moldable material; and removing said plug member from said contact with said predetermined area prior to introducing said second moldable material into said mold assembly.

3. A method according to claim 2, wherein said blocking off step further includes: positioning said plug member in contact with said predetermined area of said sheet material; then closing said mold assembly prior to introducing said first moldable material; reopening said mold assembly after introducing said first moldable material; removing said plug member from said contact with said predetermined area of said conformed sheet material; and reclosing said mold assembly prior to introducing said second moldable material.

4. A method according to claim 2, wherein said plug member is movably interconnected with one of said mold members for extension toward the other of said mold members and for retraction away from the other of said mold members, said blocking off step further including: extending said plug member into said contact with said predetermined area of said sheet material prior to introducing said first moldable material; and retracting said plug member out of said contact with said predetermined area of said sheet material after introducing said first moldable material, said extension and retraction of said mold member being performed while said mold assembly is closed.

5. A method according to claim 1, wherein said step of introducing said second moldable material includes injecting a second moldable material that cures to a relatively soft, deformable state.

6. A method according to claim 1, wherein said step of introducing said first moldable material includes reaction injection molding a multiconstituent urethane material that cures to a relatively rigid state in said mold assembly.

7. A method according to claim 6, wherein said step of introducing said second moldable material includes reaction injection molding a multiconstituent material that cures to a relatively soft, deformable state in said mold assembly.

8. A method according to claim 1, wherein said step of drawing said sheet material is performed generally simultaneously with said step of introducing said first moldable material between said first molding surface and said sheet material.

9. A method according to claim 1, further including the step of heating said sheet material prior to said step of urging said sheet material.

10. A method according to claim 1, further including the step of vacuum forming sheet material prior to said step of urging said sheet material.

11. A method according to claim 1, wherein said mold assembly is provided with movable clamping members therein, said method further including moving said clamp members into a clamping engagement with predetermined portions of said sheet material in order to clampingly secure said sheet material to said mold assembly in at least one predetermined location thereon.

12. A composite molded vehicle interior panel member having a predetermined exterior shape and configuration, said panel member being formed by a process comprising the steps of:

providing a selectively closable mold assembly including a first mold and a second mold having respective first and second molding surfaces, at least said second mold member having a shape complementary to said predetermined exterior shape of said panel;

positioning a deformable sheet material on said second molding surface;

urging said sheet material into said second mold in order to conform said sheet material to said second mold surface and to form an exterior shape of said sheet material corresponding to said predetermined exterior shape of said panel;

closing said mold assembly;

forming a relatively rigid substrate base for said sheet material be reaction injection molding a first moldable urethane material into said closed mold assembly between said first molding surface and said sheet material, said first moldable material being composed of a material having a rigidity when cured that is greater than the rigidity of said sheet material in order to retain said sheet material in said exterior shape corresponding to said predetermined exterior shape of said panel;

blocking off at least one predetermined area of said sheet material during said reaction injection molding of said first moldable urethane material in order to substantially prevent said first moldable urethane material from contacting said predetermined area of said sheet material; and reaction injection molding a second moldable urethane material into said mold assembly between said first mold surface and said conformed sheet material at least at said previously blocked-off predetermined area.

13. A composite molded panel member according to claim 12, wherein said blocking off step includes: positioning at least one plug member in contact with said predetermined area of said sheet material prior to said reaction injection molding of said first moldable urethane material; and removing said plug member from said contact with said predetermined area prior to said reaction injection molding of said second moldable urethane material into said mold assembly.

14. A composite molded panel member according to claim 13, wherein said plug member is movably interconnected with one of said mold members for extension toward the other of said mold members and for retraction away from ther other of said mold members, said blocking off step further including: extending said plug member into said contact with said predetermined area of said sheet material prior to said reaction injection molding of said first moldable urethane material; and retracting said plug member out of said contact with said predetermined area of said sheet material after said reaction injection molding of said first moldable urethane material, said extension and retraction of said mold member being performed while said mold assembly is closed.

15. A composite molded panel member according to claim 12, wherein said step of introducing said second moldable material includes reaction injecting a second moldable material that cures to a relatively soft, deformable state.

16. A composite molded panel member according to claim 12, wherein said predetermined areas comprise a vehicle interior arm rest portion of said panel.

17. A composite molded panel member according to claim 12, wherein said predetermined areas comprise a vehicle interior energy absorption portion of said panel.

18. A composite molded panel member according to claim 12, wherein said step of said sheet material is performed generally simultaneously with said step of introducing said first moldable material between said first molding surface and said sheet material.

19. A composite molded panel member according to claim 12, further including the step of heating said sheet material prior to said step of urging said sheet material.

20. A composite molded panel member according to claim 12, further including the step of vacuum forming said sheet material prior to said step of urging said sheet material.

21. A composite molded panel member according to claim 12, wherein said mold assembly is provided with movable clamping members therein, said method further including moving said clamp members into a clamping engagement with predetermined portions of said sheet material in order to clampingly secure said sheet material to said mold assembly in at least one predetermined location thereon.

22. A method of making a composite molded article, comprising the steps of:
providing a selectively closable mold assembly including a first mold and a second mold having respective first and second molding surfaces, said first and second molding surfaces having predetermined respective shapes;
positioning a deformable sheet material on said second molding surface;
heating said sheet material;
vacuum forming said sheet material into said second mold in order to conform said sheet material to said second mold surface in a configuration corresponding generally to said predetermined shape of said second molding surface;
closing said mold assembly;
forming a relatively rigid substrate base for said sheet material by introducing a first moldable material into said closed mold assembly between said first molding surface and said conformed sheet material, said first moldable material being composed of a material having a rigidity when cured that is greater than the rigidity of said sheet material in order to retain said sheet material in said configuration corresponding generally to said predetermined shape of said second molding surface;
blocking off at least one predetermined area of said conformed sheet material during said introduction of said first moldable material in order to substantially prevent said first moldable material from contacting said predetermined area of said conformed sheet material; and
introducing a second moldable material into said mold assembly between said first mold surface and said conformed sheet material at least at said previously blocked-off predetermined area.

23. A method according to claim 22, wherein said blocking off step includes: positioning at least one plug member in contact with said predetermined area of said conformed sheet material prior to introducing said first moldable material; and removing said plug member from said contact with said predetermined area prior to introducing said second moldable material into said mold assembly.

24. A method according to claim 23, wherein said blocking off step further includes: positioning said plug member in contact with said predetermined area of said conformed sheet material; then closing said mold assembly prior to introducing said first moldable material; reopening said mold assembly after introducing said first moldable material; removing said plug member from said contact with said predetermined area of said conformed sheet material; and reclosing said mold assembly prior to introducing said second moldable material.

25. A method according to claim 23, wherein said plug member is movably interconnected with one of said mold members for extension toward the other of said mold members and for retraction away from the other of said mold members, said blocking off step further including: extending said plug member into said contact with said predetermined area of said conformed sheet material prior to introducing said first moldable material; and retracting said plug member out of said contact with said predetermined area of said conformed sheet material after introducing said first moldable material, said extension and retraction of said mold member being performed while said mold assembly is closed.

26. A method according to claim 22, wherein said step of introducing said second moldable material includes injecting a second moldable material that cures to a relatively soft, deformable state.

27. A method according to claim 22, wherein said step of introducing said first moldable material includes reaction injection molding a multiconstituent urethane material that cures to a relatively rigid state in said mold assembly.

28. A method according to claim 27, wherein said step of introducing said second moldable material includes reaction injection molding a multiconstituent material that cures to a relatively soft, deformable state in said mold assembly.

29. A method according to claim 22, wherein said mold assembly is provided with movable clamping members therein, said method further including moving said clamp members into a clamping engagement with predetermined portions of said sheet material in order to clampingly secure said sheet material to said mold assembly in at least one predetermined location thereon.

30. composite molded vehicle interior panel member having a predetermined exterior shape and configuration, said panel member being formed by a process comprising the steps of:
providing a selectively closable mold assembly including a first mold and a second mold having respective first and second molding surfaces, at least said second mold member having a shape complementary to said predetermined exterior shape of said panel;
positioning a deformable sheet material on said second molding surface;
heating said sheet material;
vacuum forming said sheet material into said second mold in order to conform said sheet material to said second mold surface, said conformed sheet material having an exterior shape corresponding to said predetermined exterior shape of said panel;
closing said mold assembly;
forming a relatively rigid substrate base for said sheet material by reaction injection molding a first moldable urethane material into said closed mold assembly between said first molding surface and said conformed sheet material, said first moldable material being composed of a material having a rigidity when cured that is greater than the rigidity of said sheet material in order to retain said sheet material in said exterior shape corresponding to said predetermined exterior shape of said panel;

blocking off at least one predetermined area of said conformed sheet material during said reaction injection molding of said first moldable urethane material in order to substantially prevent said first moldable urethane material from contacting said predetermined area of said conformed sheet material; and reaction injection molding a second moldable urethane material into said mold assembly between said first mold surface and said conformed sheet material at least at said previously blocked-off predetermined area.

31. A composite molded panel member according to claim 29, wherein said blocking off step includes: positioning at least one plug member in contact with said predetermined area of said conformed sheet material prior to said reaction injection molding of said first moldable urethane material; and removing said plug member from said contact with said predetermined area prior to said reaction injection molding of said second moldable urethane material into said mold assembly.

32. A composite molded panel member according to claim 31, wherein said plug member is movably interconnected with one of said mold members for extension toward the other of said mold members and for retraction away from the other of said mold members, said blocking off step further including: extending said plug member into said contact with said predetermined area of said conformed sheet material prior to said reaction injection molding of said first moldable urethane material; and retracting said plug member out of said contact with said predetermined area of said conformed sheet material after said reaction injection molding of said first moldable urethane material, said extension and retraction of said mold member being performed while said mold assembly is closed.

33. A composite molded panel member according to claim 30, wherein said step of introducing said second moldable material includes injecting a second moldable material that cures to a relatively soft, deformable state.

34. A composite molded panel member according to claim 30, wherein said predetermined areas comprise a vehicle interior arm rest portion of said panel.

35. A composite molded panel member according to claim 30, wherein said predetermined areas comprise a vehicle interior energy absorption portion of said panel.

36. A composite molded panel member according to claim 30, wherein said mold assembly is provided with movable clamping members therein, said method further including moving said clamp members into a clamping engagement with predetermined portions of said sheet material in order to clampingly secure said sheet material to said mold assembly in at least one predetermined location thereon.

37. A composite molded panel member according to claim 13, wherein said blocking off step further includes: positioning said plug member in contact with said predetermined area of said sheet material; then closing said mold assembly prior to introducing said first moldable material; reopening said mold assembly after introducing said first moldable material; removing said plug member from said contact with said predetermined area of said conformed sheet material; and reclosing said mold assembly prior to introducing said second moldable material.

38. A composite molded panel member according to claim 31, wherein said blocking off step further includes: positioning said plug member in contact with said predetermined area of said sheet material; then closing said mold assembly prior to introducing said first moldable material; reopening said mold assembly after introducing said first moldable material; removing said plug member from said contact with said predetermined area of said conformed sheet material; and reclosing said mold assembly prior to introducing said second moldable material.

* * * * *

UNITED STATES PATENT AND TRADEMARK OFFICE
CERTIFICATE OF CORRECTION

PATENT NO. : 4,766,025
DATED : August 23, 1988
INVENTOR(S) : John L. Sanok, Michael L. Piechura It is certified that error appears in the above-identified patent and that said Letters Patent is hereby corrected as shown below:

Column 5, line 10, "curves" should be --cures--.

Column 8, line 18, claim 12, "be" should be --by--.

Column 8, line 52, claim 14, "ther" should be --the--.

Column 9, line 8, claim 18, after "of" insert --urging--.

Column 11, line 15, claim 30, after "and" insert new paragraph beginning with "reaction"

Signed and Sealed this

Twenty-fourth Day of January, 1989

Attest:

DONALD J. QUIGG

*Attesting Officer*   *Commissioner of Patents and Trademarks*